(12) United States Patent
Pritchard, Jr. et al.

(10) Patent No.: US 9,982,598 B2
(45) Date of Patent: May 29, 2018

(54) GAS TURBINE ENGINE VARIABLE BLEED VALVE FOR ICE EXTRACTION

(71) Applicant: General Electric Company, Schenectady, NY (US)

(72) Inventors: Byron Andrew Pritchard, Jr., Loveland, OH (US); Charles Daniel Califf, Lawrenceburg, IN (US); Peter John Wood, Loveland, OH (US); Raymond Gust Holm, Lebanon, OH (US); Allan George van de Wall, Cincinnati, OH (US); Peter Alfred Pezzi, Columbus, OH (US)

(73) Assignee: General Electric Company, Schenectady, NY (US)

( * ) Notice: Subject to any disclaimer, the term of this patent is extended or adjusted under 35 U.S.C. 154(b) by 906 days.

(21) Appl. No.: 13/657,193

(22) Filed: Oct. 22, 2012

(65) Prior Publication Data

US 2014/0109589 A1   Apr. 24, 2014

(51) Int. Cl.
| | |
|---|---|
| *F02C 7/052* | (2006.01) |
| *F02C 6/08* | (2006.01) |
| *F04D 27/02* | (2006.01) |
| *F02C 7/28* | (2006.01) |
| *F02C 9/28* | (2006.01) |
| *F02K 3/075* | (2006.01) |
| *F02C 9/18* | (2006.01) |

(52) U.S. Cl.
CPC ............... *F02C 7/052* (2013.01); *F02C 6/08* (2013.01); *F02C 7/28* (2013.01); *F02C 9/18* (2013.01);

(Continued)

(58) Field of Classification Search
CPC .... F02K 3/075; F02C 9/18; F02C 9/28; F02C 7/052; F02C 7/262; F02C 6/08;
(Continued)

(56) References Cited

U.S. PATENT DOCUMENTS

| | | | |
|---|---|---|---|
| 3,638,428 | A | 2/1972 | Shipley et al. |
| 3,964,257 | A | 6/1976 | Lardellier |

(Continued)

FOREIGN PATENT DOCUMENTS

| | | |
|---|---|---|
| EP | 0511770 A1 | 11/1992 |
| JP | H04-5437 A | 1/1992 |

OTHER PUBLICATIONS

Search Report from PCT/US2013/065841 dated Feb. 27, 2014.
Notification of Reasons for Refusal issued in connection with corresponding JP Application No. 2015-538102 dated Jun. 6, 2017.

*Primary Examiner* — William H Rodriguez
*Assistant Examiner* — William Breazeal
(74) *Attorney, Agent, or Firm* — General Electric Company; Brian P. Overbeck (57) ABSTRACT

A variable bleed valve includes a variable bleed valve door disposed in a bleed inlet in transition duct and rotatable about an axis at or near a forward end of door. Valve is operable to open and close a bleed slot open to a booster bleed flowpath located outwardly of transition duct and having an airflow restrictor. Airflow restrictor may be variable such as a flapper valve. Booster bleed flowpath may pass through a bifurcated bleed duct including an inner passage radially bound by spaced apart inner and middle bleed walls and an outer passage radially bound by middle bleed wall and an outer bleed wall. Airflow restrictor may include an outlet area smaller than an inlet area of inner passage. Door seals against middle bleed wall to open inner passage and against outer bleed wall to open both passages.

2 Claims, 9 Drawing Sheets

(52) U.S. Cl.
CPC ............... *F02C 9/28* (2013.01); *F02K 3/075* (2013.01); *F04D 27/023* (2013.01); *F04D 27/0215* (2013.01); *F05D 2260/606* (2013.01); *F05D 2260/607* (2013.01)

(58) Field of Classification Search
CPC ........ F02C 7/28; F23N 2041/20; F23N 5/232; F05B 2220/50; F05B 2260/301; Y02E 20/16; Y02E 20/18; Y02T 50/671; Y02T 50/673; F01K 23/10; F01D 17/105; F05D 2260/606; F05D 2260/607; F04D 27/023; F04D 27/0215
See application file for complete search history.

(56) References Cited

U.S. PATENT DOCUMENTS

| | | |
|---|---|---|
| 4,250,703 A | 2/1981 | Norris et al. |
| 4,329,114 A * | 5/1982 | Johnston ............... F01D 11/24 415/116 |
| 4,463,552 A | 8/1984 | Monhardt et al. |
| 5,113,649 A * | 5/1992 | Siedlecki, Jr. ........... F02C 7/18 60/226.3 |
| 5,119,625 A | 6/1992 | Glowacki |
| 5,123,240 A | 6/1992 | Frost et al. |
| 5,261,228 A | 11/1993 | Shuba |
| 5,269,135 A | 12/1993 | Vermejan et al. |
| 5,279,109 A | 1/1994 | Liu et al. |
| 5,351,473 A | 10/1994 | Shuba |
| 5,357,742 A | 10/1994 | Miller |
| 6,742,324 B2 | 6/2004 | Bachelder et al. |
| 7,296,395 B1 * | 11/2007 | Hartman ............... B01D 45/04 244/53 B |
| 7,624,581 B2 | 12/2009 | Moniz |
| 9,518,513 B2 | 12/2016 | Pritchard, Jr. et al. |
| 2007/0234704 A1 | 10/2007 | Moniz et al. |
| 2009/0056307 A1 | 3/2009 | Mons |
| 2012/0070271 A1 | 3/2012 | Urban et al. |

* cited by examiner

GAS TURBINE ENGINE VARIABLE BLEED VALVE FOR ICE EXTRACTION

BACKGROUND OF THE INVENTION

Field of the Invention

The invention relates to gas turbine engine variable bleed valves and, more particularly, to such valves used to prevent surge and remove ice from duct between booster and core engine compressor.

Description of Related Art

It is well known in the gas turbine engine field to provide variable bleed valves (VBVs), typically, doors that open to provide a bleed flowpath to bleed off compressed air between the booster and core engine compressor of gas turbine engines. The air is often bled from what is referred to as a gooseneck flowpath between the booster and core engine compressor. Aircraft fan jet gas turbine engines and marine and industrial derivatives of such engines have employed various forms of curved flowpaths and VBV bleed doors that are retracted into the flowpath casing so as to form an entrance to a bleed duct that bleeds booster or low pressure compressor discharge airflow to draw particles out of the flowpath in a manner such as that disclosed in U.S. Pat. No. 4,463,552 entitled "Combined Surge Bleed and Dust Removal System for a Fan-Jet Engine" by Monhardt et al.

Because the bleed flow abruptly curves away from the direction of the compressor flow, it is very difficult to hold larger particles in the bleed flow because of their momentum. This problem is common to aircraft, marine, and ground based gas turbine engines. Turbofan jet engines, such as the General Electric CF6 and GE90 series of engines, have in series relationship a fan, a booster, and a core engine compressor, whereby a portion of the air passing through the fan is ducted to the booster and then the core engine compressor. In order to match the inlet airflow of the core engine compressor to its flight operational requirements and to prevent booster stall, a booster variable bleed valve (VBV) is provided in the form of a booster bleed duct having an inlet between the booster and the core engine compressor and an outlet to the fan duct.

Opening and closing of the booster bleed duct is conventionally provided by a circumferentially disposed plurality of pivotal doors that retract into the engine structure or casing and are operated by a single unison ring powered by one or more fuel powered actuators. Bellcrank linkages operably connect the retracting pivotal bleed doors to the unison ring. An example of such a stall prevention system using a retracting pivotal door, as compared to a sliding door or valve in the Monhardt patent, is disclosed in U.S. Pat. No. 3,638,428 entitled "Bypass Valve Mechanism" by Shipley et al. and assigned to the same assignee as the present invention and incorporated herein by reference. The operation of the VBV is scheduled by the engine controller, either a mechanical or digital electronic type may be used.

The problem associated with conventional bleed valve ducts and valve doors is that larger particles and amounts of particles such as ice are often not drawn into the bleed duct. It is desirable to have an engine that provides the ability to remove large amounts of ice from the compressor airflow and as well as efficiently bleed air between the booster and the core engine compressor. Thus, it is highly desirable to remove ice from the gooseneck flowpath without removing core airflow or minimizing the amount of core airflow that is removed.

On the other hand, higher bypass ratio engines have smaller core flow and larger bullet-nose frontal area. This means more ice, hail, or water gets through the compressor into the combustor resulting in higher water content for the air. These two fundamental phenomena combine to cause substantial increase of water-to-air ratio in the combustor resulting in such aircraft engines being more susceptible to engine flame out problem in rain or hail storms. The higher bypass ratio engines, having the large frontal area, also result in increased ice accretion on the booster inlet and booster stages during idle operation within an icing environment. This results in increased ice shed during the acceleration, including sheds at or near maximum power operation. It also increases the risk of compressor stall due to the ice sheds and more particularly to high speed rotor ice sheds, which historically has been an issue on two-shaft large engines, and will continue to be an issue on future large engines.

Modern high bypass ratio engines incorporate higher pressure core compressors and lower pressure boosters and, thus, produce less pressure difference between the booster exit and the fan bypass duct. This increases the difficulty of bleeding sufficient amounts of air from downstream of the booster to the fan bypass duct for protecting boosters from stall. The booster stall margin is controlled by opening the VBV doors to dump some of the booster flow overboard so as to control the booster operating line to a point below its stall line.

Thus, it is highly desirable to have a variable bleed valve and system for high bypass ratio engines incorporate higher pressure core compressors and lower pressure boosters bleed sufficient amounts of air from downstream of the booster for protecting boosters from stall. It is also highly desirable to have a variable bleed valve and system for such high bypass ratio engines able to prevent ice sheds and more particularly high speed rotor ice sheds from causing compressor stall or flame quenching in the combustor.

SUMMARY OF THE INVENTION

A gas turbine engine variable bleed apparatus includes a variable bleed valve including a variable bleed valve door disposed in a bleed inlet in a transition duct and forward and aft lips located at upstream or forward and downstream or aft ends of the door. The door is pivotable or rotatable about an axis at or near the forward end of the door, the variable bleed valve operable to open and close a bleed slot open to a booster bleed flowpath located radially outwardly of the transition duct. The bleed slot extends generally radially outwardly from an outer annular wall of the transition duct at the bleed inlet to the aft lip of the VBV door and an airflow restrictor is disposed in the booster bleed flowpath. The airflow restrictor may be a variable airflow restrictor such as a flapper valve.

The transition duct may have a transition duct conical angle with respect to an engine centerline, a booster outer shroud upstream and adjacent the transition duct, the booster outer shroud having a booster conical angle with respect to an engine centerline, and the transition duct conical angle being greater than the booster conical angle.

The booster bleed flowpath may extend through a bifurcated bleed duct including inner and outer passages, radially spaced apart inner and middle bleed walls radially bounding the inner passage, and the middle bleed wall and an outer bleed wall radially spaced apart from the middle bleed wall and radially bounding the outer passage. The airflow restrictor may be located at an inner passage exit of the inner passage and include an outlet area of the inner passage at the inner passage exit larger than an inlet area of the inner passage.

The door may be operable to cooperate with and substantially seal the aft lip at the aft end of the door against the middle bleed wall to fully open the inner passage and to cooperate with and substantially seal the aft lip against the outer bleed wall to fully open the inner and outer passages.

The booster bleed flowpath may also extend through a bleed duct that is not bifurcated and is radially bounded by radially spaced apart and curved inner and outer bleed walls that are curved radially inwardly. The bleed duct extends downstream or aft from a bleed duct inlet to a bleed duct outlet and a variable airflow restrictor is operably located at the bleed duct outlet.

The booster bleed flowpath may also extend through the booster bleed flowpath downstream or aft from the VBV door with no bleed duct and the booster bleed flowpath radially inwardly bounded by a radially inwardly curved inner bleed wall. The airflow restrictor is a variable airflow restrictor. The variable airflow restrictor may be a flapper valve which may be operably linked to a radially outer end of the door.

A method of operating the variable bleed valve includes rotating a variable bleed valve door of a gas turbine engine variable bleed valve disposed in a bleed inlet in a transition duct about an axis at or near the forward end of the door to open and close a bleed slot at an inlet of a bifurcated bleed duct. The bleed slot extending generally radially outwardly from the transition duct to an aft lip at an aft end of the door.

The method may further include opening and closing inner and outer passages of the bifurcated bleed duct wherein radially spaced apart inner and middle bleed walls radially bound the inner passage and the middle bleed wall and an outer bleed wall radially spaced apart from the middle bleed wall radially bound the outer passage. Fully opening the inner passage by rotating the door about the axis to substantially seal the aft end against the middle bleed wall and fully opening both the inner and outer passages by rotating the door about the axis to substantially seal the aft end against the outer bleed wall.

The method may further include fully opening the inner passage and partially to fully opening the outer passage by rotating the door about the axis to move the aft lip between the middle and outer bleed walls to modulate bleed air from the core airflow in the transition duct for booster operating line control.

Another method of operating a gas turbine engine variable bleed valve including a variable bleed valve door disposed in a bleed inlet in a transition duct and rotatably attached to a hub frame includes rotating the door about an axis at or near the forward end of the door to open and close a bleed slot open to a booster bleed flowpath disposed through the hub frame and simultaneously opening or closing a variable airflow restrictor disposed in the booster bleed flowpath, and operating the valve and the restrictor to bleed core airflow and/or extract ice in the transition duct.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
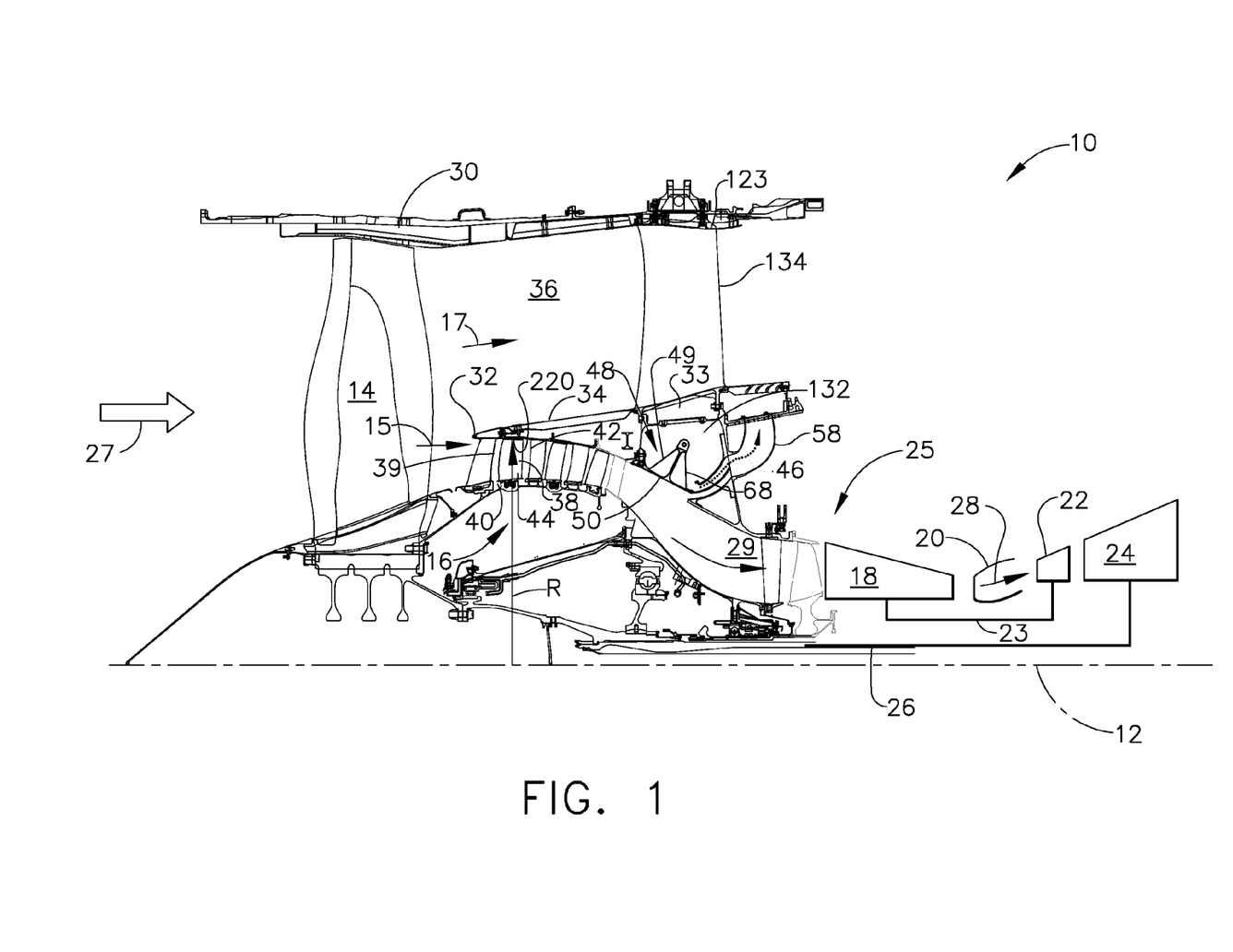
FIG. 1 is a longitudinal part sectional and part diagrammatical view illustration of an exemplary embodiment of an aircraft turbofan gas turbine engine with a variable bleed valve (VBV) in a transition duct between a booster and a high pressure compressor that turns core airflow exiting out of the booster.

Illustrated in FIG. 1 is an exemplary aircraft turbofan gas turbine engine 10 circumscribed about an engine centerline 12 and suitably designed to be mounted to a wing or fuselage of an aircraft. The engine 10 includes, in downstream serial flow communication, a fan 14, a booster 16, a high pressure compressor 18, a combustor 20, a high pressure turbine (HPT) 22, and a low pressure turbine (LPT) 24. A core engine 25 includes the HPT or high pressure turbine 22 joined by a high pressure drive shaft 23 to the high pressure compressor 18 and the combustor 20. The LPT or low pressure turbine 24 is joined by a low pressure drive shaft 26 to both the fan 14 and the booster 16.

There are high bypass aircraft gas turbine engines such as some built by Rolls Royce that have more than two compressors and turbines. Rolls Royce, for example, has a three spool engine with three compressors each of which is driven by a different turbine. Thus, the VBV valve and door disclosed herein may be incorporated between two compressors and is not limited to being only between a low pressure compressor such as the booster illustrated herein and a high pressure compressor.

In typical operation, air 27 is pressurized by the fan 14 and produces an inner or core airflow 15 channeled through the booster 16 which further pressurizes the core airflow 15. The pressurized air is then flowed to the high pressure compressor 18 which further pressurizes the air. The pressurized air is mixed with fuel in the combustor 20 for generating hot combustion gases 28 that flow downstream, in turn, through the HPT 22 and the LPT 24.

A flow splitter 34 surrounding the booster 16 immediately behind the fan 14 includes a sharp leading edge 32 which splits the fan air 27 pressurized by the fan 14 into a radially inner stream (core airflow 15) channeled through the booster 16 and a radially outer stream or bypass airflow 17 is channeled through a bypass duct 36 spaced radially outwardly from the booster 16. A fan casing 30 surrounding the fan 14 and the bypass duct 36 is supported by an annular fan frame 33 circumscribed about the engine centerline 12. The booster 16 includes alternating annular rows 44 of booster blades and vanes 38, 42 extending radially outwardly and inwardly across a booster flowpath 39 in a booster duct 40. The annular row of booster blades 38 are suitably joined to the fan 14. The booster 16 is located forward of the fan frame 33 and radially inboard of the flow splitter 34.

The fan frame 33 includes an annular outer frame casing 123, a fan hub frame 129, and a plurality of circumferentially spaced apart duct struts 134 extending therebetween. The duct struts 134 are airfoil shaped since bypass air passes between the adjacent ones thereof. A transition duct 29 also referred to as a gooseneck is located at a radially inner end 136 of the fan hub frame 129 and is axially disposed between and in fluid communication with the booster 16 and the high pressure compressor 18 of the core engine 25. Bleed exhaust ducts 58 lead away from the fan hub frame 129 to the bypass duct 36.

Figure 2:
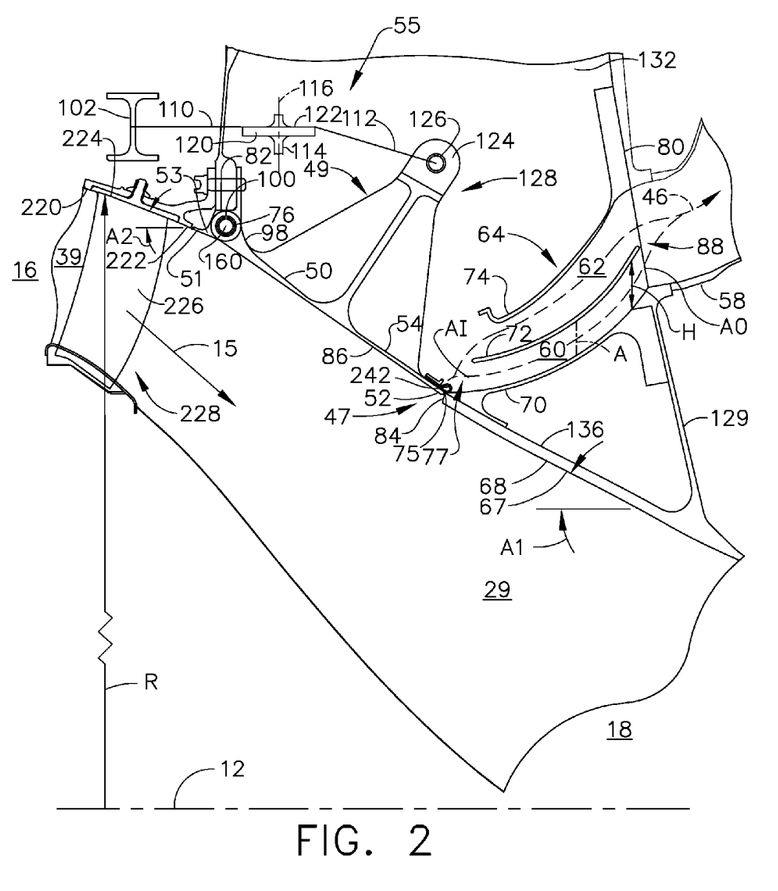
FIG. 2 is an enlarged part sectional and part diagrammatical view illustration of a door of the valve in a closed position in the engine illustrated in FIG. 1.

Referring to FIGS. 1 and 2, a bleed inlet 47, an opening, is disposed in an outer annular wall 67 of a transition duct 29 between booster 16 and the high pressure compressor 18. In the exemplary embodiments of the transition duct 29 illustrated in FIGS. 2-4 and 8-9, the outer annular wall 67 is an outer conical wall 68 and in the exemplary embodiments of the transition duct 29 illustrated in FIGS. 5-7, the outer annular wall 67 is curved. A variable bleed apparatus 48 is used to bleed the core airflow 15 between booster 16 and the high pressure compressor 18 to prevent the booster 16 from stalling under certain engine operating conditions.

The variable bleed apparatus 48 includes a variable bleed valve 49 (VBV) with a variable bleed valve door 50 disposed in the bleed inlet 47. The VBV door 50 is illustrated in FIG. 2 in a closed position completely closing the bleed inlet 47. The VBV door 50 is operable to open a bleed slot 170 open to a booster bleed flowpath 46 located radially outwardly of the transition duct 29 and extending from the VBV door 50 through the fan hub frame 129 through the bleed exhaust ducts 58 to the bypass duct 36. The bleed slot 170 extends radially from the outer conical wall 68 of the transition duct 29 at the bleed inlet 47 to the aft lip 52 of VBV door 50.

The VBV door 50 includes forward and aft lips 51, 52 located at upstream or forward and downstream or aft ends 53, 54 of the door 50. The VBV door 50 is used to bleed air and extract ice from the booster and the transition duct 29 before it reaches the high pressure compressor 18 where it can cause stall conditions, airflow instability conditions, and quench the flame or combustion in the combustor 20. A circumferentially disposed plurality of booster bleed flowpaths 46 indicated by the arrows and dotted line labeled 46 extend from the VBV door 50 in the fan hub frame 129 through the bleed exhaust ducts 58 to the bypass duct 36.

Referring back to FIG. 2, the VBV door 50 is pivotable or rotatable about an axis 160 which is exemplified by a hinge axis 160. The VBV door 50 is actuated by actuators (not shown) that forwardly and aftwardly axially translate and rotate radially unison ring 102 with respect to engine centerline 12. It is well known to operate or rotate VBV doors open and close using actuators, unison rings, and bellcranks for positioning the doors. One example of this may be found in U.S. Pat. No. 3,638,428 to Shipley, et al., Feb. 1, 1972, entitled "BYPASS VALVE MECHANISM".

The VBV door 50 is hinged to the fan hub frame 129 of the fan frame 33 near a forward end 53 of the VBV door 50. A door hinge 82 rotatably connects or hinges the VBV door 50 to the fan hub frame 129. A linkage 55 includes forward and aft links 110, 112 linked to forward and aft bellcrank arms 120, 122 of a bellcrank 114. The forward link 110 operably links the unison ring 102 to the forward bellcrank arm 120. The aft link 112 operably links the aft bellcrank arm 122 to an outer clevis 124 of an outer ball joint 126 on a radially outer end 128 of the VBV door 50. The bellcrank 114 pivots about a bellcrank axis 116 which is fixed with respect to the fan hub frame 129. This opens and closes the VBV door 50.

The exemplary embodiment of the variable bleed valve 49 includes a variable flow bifurcated bleed duct 64 radially adjacent inner and outer passages 60, 62 inside the fan hub frame 129 leading to the bleed exhaust duct 58. Radially spaced apart inner and middle bleed walls 70, 72 radially bound the inner passage 60. The middle bleed wall 72 and a radially outer bleed wall 74 radially spaced apart from the middle bleed wall 72 radially bound the outer passage 62. The exemplary embodiment of the radially spaced apart inner, middle, and outer bleed walls 70, 72, 74 are curved radially inwardly. A forward lip 75 along a forward edge of the inner passage 60 and an edge of the outer conical wall 68 of the transition duct 29 meet along the bleed inlet 47 to provide a scoop 84 to enhance ice extraction. When the variable bleed valve 49 and the VBV door 50 are opened or in an open position, a bleed slot 170 at a bleed duct inlet 77 to the bifurcated bleed duct 64 is opened allowing bleed air 19 from the core airflow 15 to flow into the inner passage 60 or both the inner and outer passages 60, 62.

Figure 3:
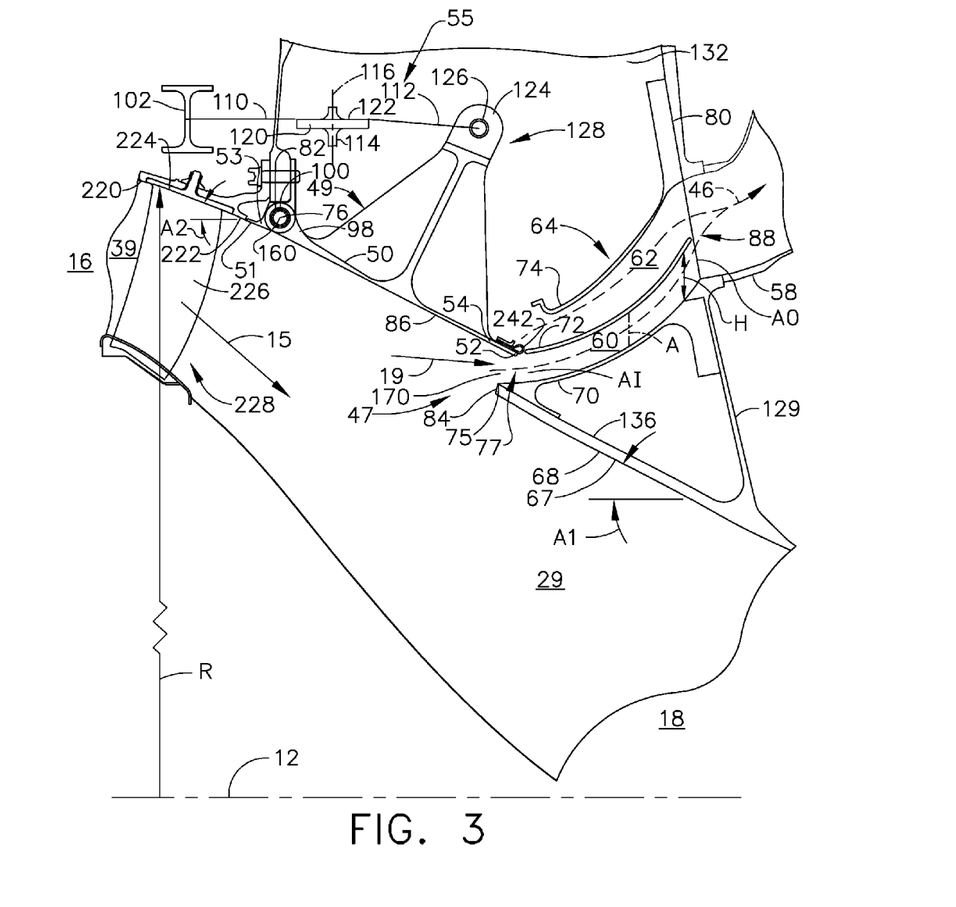
FIG. 3 is a sectional view illustration of the valve in a partially open position and the door illustrated in FIG. 2 in a first outwardly rotated position with respect to a transition duct in the engine.
Figure 4:
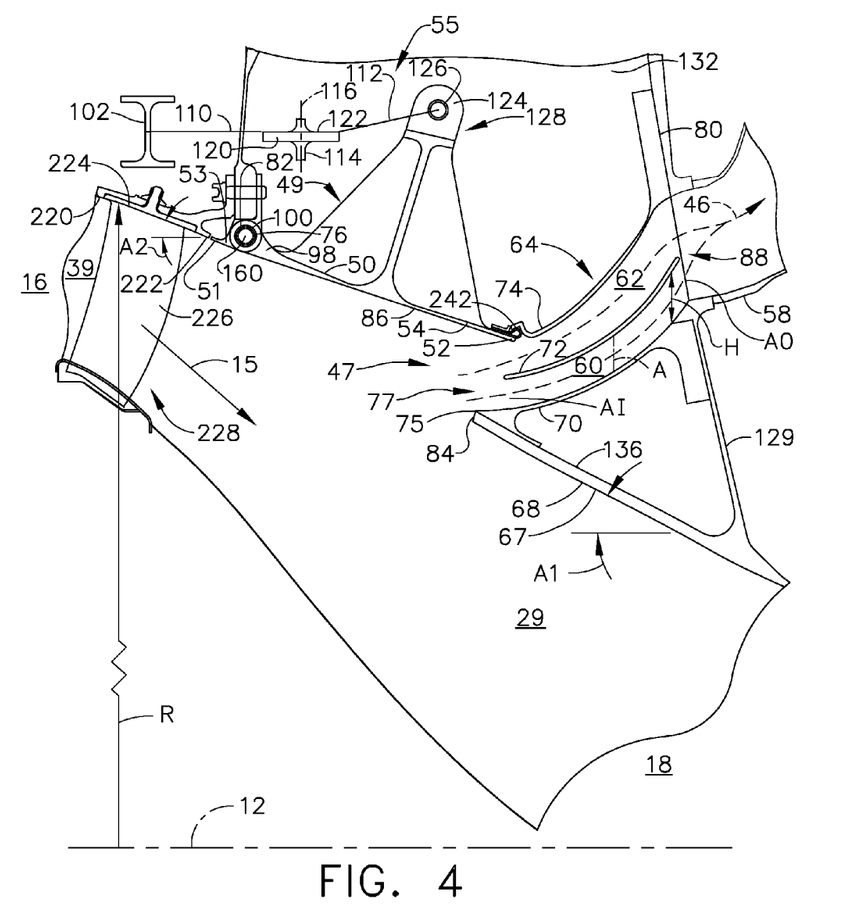
FIG. 4 is a sectional view illustration of the valve in a fully open position and the door illustrated in FIG. 2 in a second outwardly rotated position with respect to a transition duct in the engine.

The variable bleed valve 49 is designed to be operated with the VBV door 50 in a fully closed or in a closed position as illustrated in FIG. 2 and in first and second or partial and full open positions as illustrated in FIGS. 3 and 4 respectively. The VBV door 50 may be rotated to any position between the fully closed position and the full open position as illustrated in FIGS. 3 and 4 respectively. The VBV door 50 in the fully closed position when the aft lip 52 at the aft end 54 of the VBV door 50 seals against the inner bleed wall 70 and seals the bleed inlet 47.

The aft lip 52 at the aft end 54 of the VBV door 50 cooperates with the middle and outer bleed walls 72, 74 to open the inner and outer passages 60, 62 to the transition duct 29 and the core airflow 15 through the bleed inlet 47. The VBV door 50 is rotated to cooperate with and substantially seal the aft lip 52 at the aft end 54 of the VBV door 50 against the middle bleed wall 72 to open the inner passage 60. The VBV door 50 is rotated to cooperate with and substantially seal the aft lip 52 at the aft end 54 of the door 50 against the outer bleed wall 74 to open both the inner and outer passages 60, 62.

The inner and outer passages 60, 62 are sized and shaped to minimizes the impact on core airflow 15 and cycle operation such as by sizing an effective flow area A of the inner passage 60. This can be done by reducing either the circumferential width of this inner passage 60 or a passage radial height H at an inner passage exit 80. This provides an outlet area AO smaller than an inlet area AI of the inner passage 60 and the outlet area AO serves as an airflow restrictor 88 in the booster bleed flowpath 46 at the inner passage exit 80 of the inner passage 60. This aft end area of the inner passage 60 is sized so that the airflow through this passage is limited and is an amount acceptable for exhaust gas temperature (EGT) considerations. Seals 242 on the aft lip 52 at the downstream or aft end 54 of the door 50 and along side edges 86 of the VBV door minimize airflow losses and negative cycle impacts when the VBV door is in an open position.

The exemplary embodiment of the variable bleed valve 49 includes one or more hinge pins 76 rotatably disposed through linearly aligned coaxial hinge holes 100 in clevis lugs 98 of the hinge 82 attached to the VBV door 50 and the fan hub frame 129. The VBV door 50 is rotatably connected to the fan hub frame 129. The hinge axis 160 passes through the one or more hinge pins 76 and about which the VBV door 50 is rotatable. The VBV door 50 is thus operable to rotate outwardly of and away from the transition duct 29 about the hinge axis 160 at or near the forward end 53 of the VBV door 50.

The exemplary embodiment of the variable bleed valve 49 is operated with the VBV door 50 fully closed or in the closed position as illustrated in FIG. 2 for high speed performance operation with no bleed air 19 removed from the core airflow 15 and no ice removed from the transition duct 29. The VBV door 50 may be rotated to the partially open first position as illustrated in FIG. 3 with the VBV door 50 cooperating with and substantially sealing the aft lip 52 at the aft end 54 of the VBV door 50 against the middle bleed wall 72 to open the inner passage 60. This first position is designed primarily for high speed and high power engine operation with ice, water, dust, and dirt extraction from the transition duct 29. Little bleed air 19 is removed from the core airflow 15 at this engine operating condition and variable bleed valve setting.

The VBV door 50 may be rotated to the fully open second position as illustrated in FIG. 4 with the VBV door 50 cooperating with and substantially sealing the aft lip 52 at the aft end 54 of the VBV door 50 against the outer bleed wall 74 to open both the inner and outer passages 60, 62. This second fully open position is designed primarily for low speed engine operation and also provides ice, water, dust, and dirt extraction from the transition duct 29. This is typically done at idle and part power engine operation to pass the maximum required airflow for booster operating line control. The VBV door 50 can also be rotated between the first and second open positions to modulate the bleed air 19 from the core airflow 15 for booster operating line control. The modulation includes rotating the VBV door 50 so the aft lip 52 at the aft end 54 of the VBV door 50 moves between the middle and outer bleed walls 72, 74 to vary or modulate the bleed air 19 flowing through the outer passages 62. This fully opens the inner passage 60 and varies the amount the outer passage 62 is open.

Referring to FIGS. 1 and 2, ice and other particle removal is enhanced by further turning the core airflow 15 radially inwardly towards the engine centerline 12 and the high pressure compressor 18 in the transition duct 29 after it exists a booster outlet 228 leading to the transition duct 29. Also, a booster outer flowpath 220 has a relatively high radius R, as measured from the engine centerline 12, over the last few stages of the booster 16. This flow turning is accomplished by the outer conical wall 68 of the transition duct 29 having a transition duct conical angle A1, with respect to the engine centerline 12, greater than a booster conical angle A2 of a booster outer shroud 222. The booster outer shroud 222 surrounds outer ends 224 of booster outlet guide vanes 226 (OGV) at the booster outlet 228.

Core airflow 15 exiting the booster 16 flows linearly on a path that is tangent to the outer flowpath of the booster outlet 228 which is generally the same as the booster outer shroud 222. In an ice shed, the ice particles follow this same path or trajectory with most of the ice being located in the outer portion of the flowpath. Conventionally, the flow direction set by the outer flowpath of the booster outlet 228 is parallel to the VBV door 50. Having the transition duct conical angle A1 greater than the booster conical angle A2 by about 10 degrees or more is more conducive for extracting shed ice at high speed, while minimizing the amount of airflow bleed from the booster discharge and thereby minimizing the exhaust gas temperature (EGT) and other cycle effects.

The core airflow 15 in the booster and transition duct stays attached to the wall, and turns down into the compressor because of its difference in conical angles. However, ice particles have too much mass and inertia to make this turn, and they continue on their straight trajectory out of booster. They then collide with the outer wall of the transition duct and slide along it until the flowpath turns again going into the HPC. When the aft slot is opened up at the aft end of the VBV door, the ice in the outer flowpath either collides with and slides along the bottom of the VBV door into the fan hub frame, or continues on its straight trajectory out of the booster and into the fan hub frame through the bleed slot 170. This will result in the particles being centrifuged outward and more readily extracted. In addition, the blade and vane designs may be changed to introduce more outward push to ice by an increased dihedral blade shape.

Figure 5:
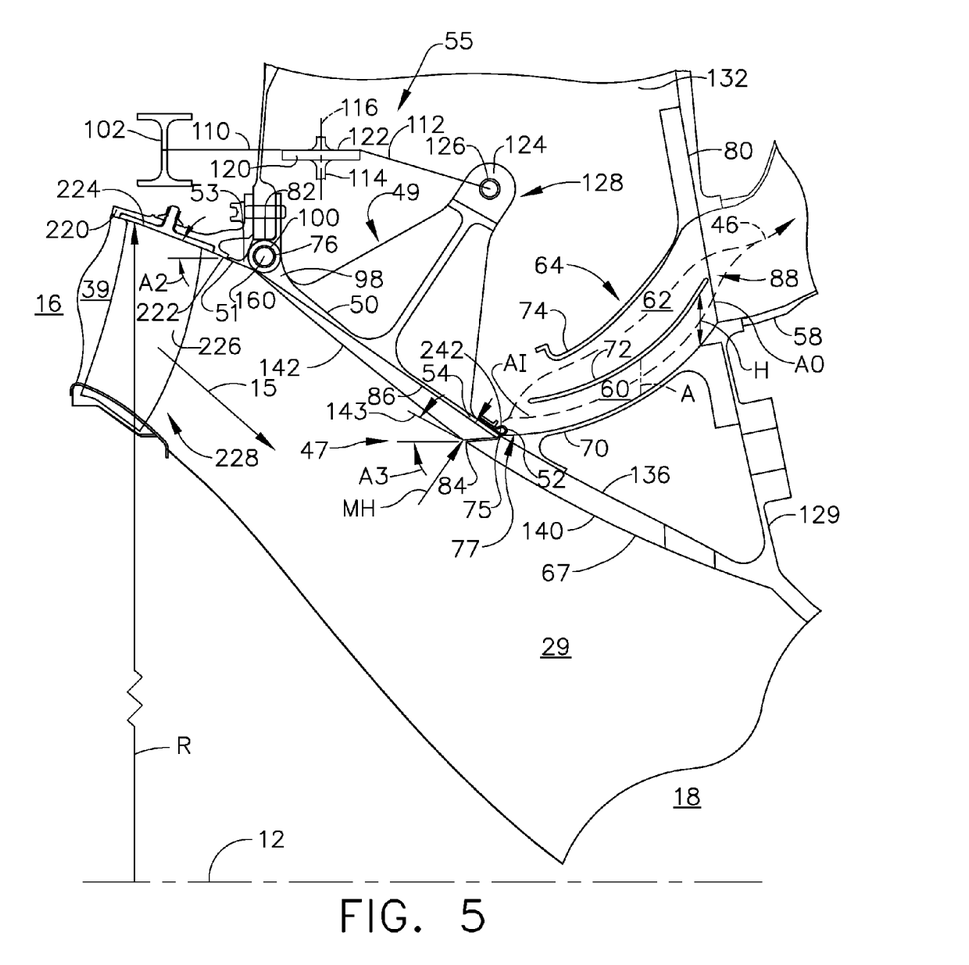
FIG. 5 is a sectional view illustration of an alternative door having a curved inner surface and deeper valve scoop than the door illustrated in FIG. 2.
Figure 6:
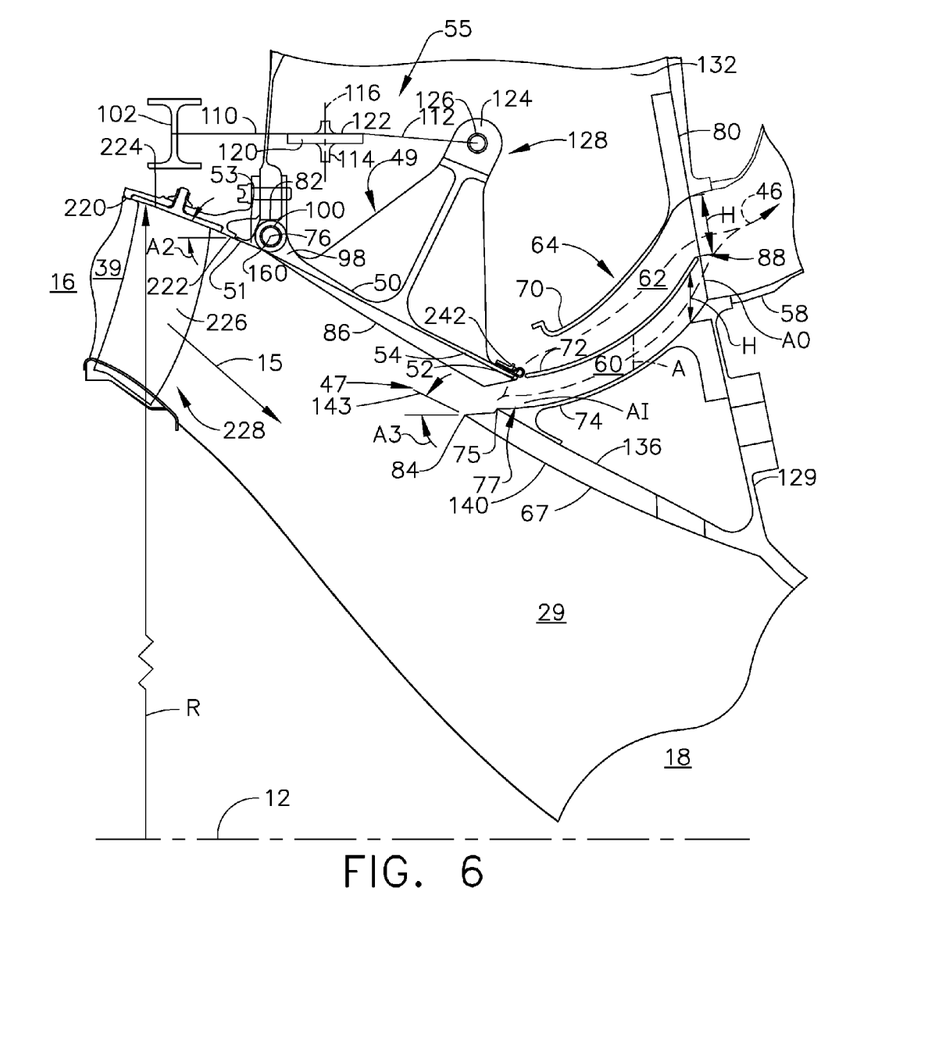
FIG. 6 is a sectional view illustration of the door illustrated in FIG. 5 in a first outwardly rotated position with respect to a transition duct in the engine.
Figure 7:
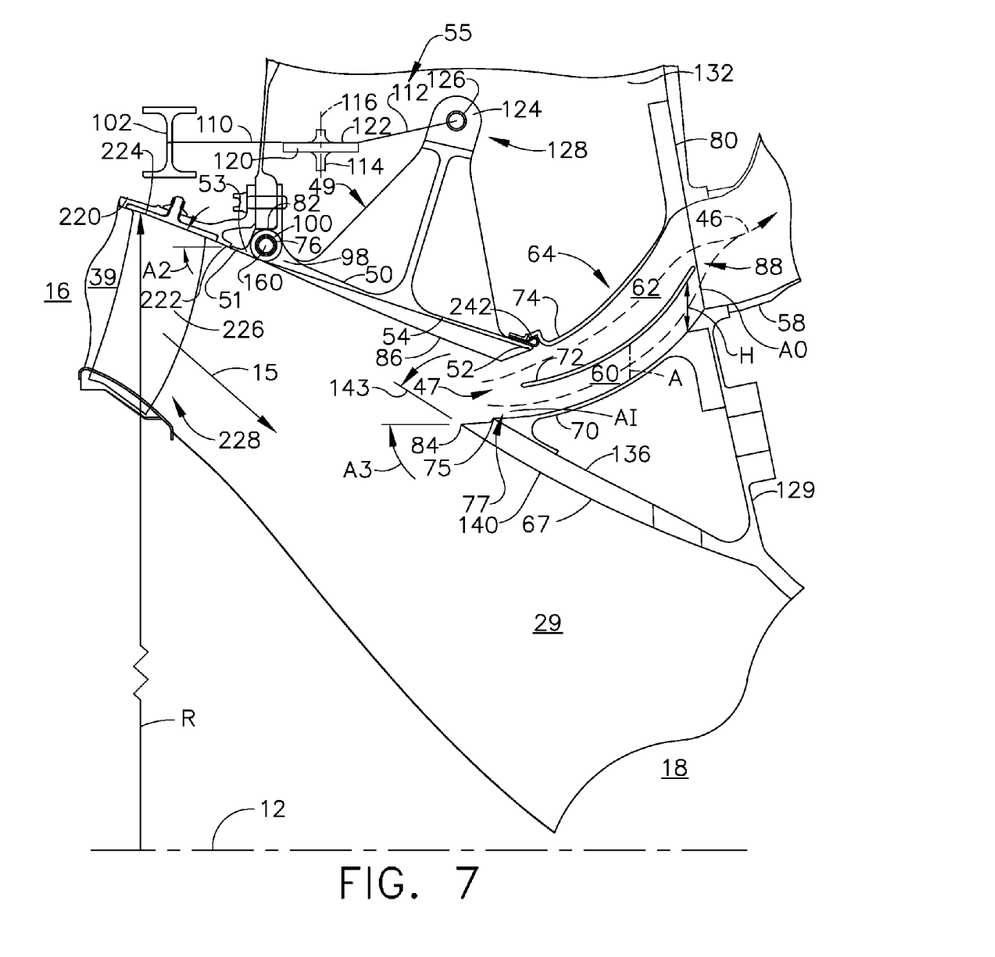
FIG. 7 is a sectional view illustration of the door illustrated in FIG. 5 in a second outwardly rotated position with respect to a transition duct in the engine.

Illustrated in FIGS. 5-7 is an alternative embodiment of the variable bleed valve 49 with an alternative transition duct 29 and alternative VBV door 50. Instead of a purely conical outer wall in the transition duct 29 between booster 16 and the high pressure compressor 18, there is a bowed or curved outer annular wall 140 of the transition duct 29. The VBV door 50 includes a substantial portion of the outer annular wall 140. The outer annular wall 140 of the transition duct 29 include a radially inwardly axially curved surface 142 that curves radially inwardly towards the engine centerline 12 such that the VBV door 50 protrudes into the transition duct 29 and further turns the core airflow 15 radially inwardly in the transition duct 29. The curved outer annular wall 140 has a tangent 143 at the bleed inlet 47 adjacent the aft end 54 of the VBV door 50. The tangent 143 has a transition duct annular wall angle A3 the with respect to the engine centerline 12. The annular wall angle A3 is greater than the booster conical angle A2 of the booster outer shroud 222.

The curved surface 142 substantially reaches its max height MH at the aft end 54 of the door 50. The curved surface 142 continues axially aft and narrows in surface height along the outer annular wall 140 from the bleed inlet 47 adjacent the aft end 54 of the VBV door 50 until the curved surface height is 0 at an axially aft end of the curved surface 142. The surface may be circular or parabolic, or elliptical or otherwise curved. A forward lip 75 along a forward edge of the inner passage 60 and an edge of the outer conical wall 68 of the transition duct 29 meet along the bleed inlet 47 to provide a scoop 84 to enhance ice extraction. This scoop is deeper and extends further into the transition duct 29 than in the embodiment illustrated in FIG. 2 and further enhances ice extraction.

The variable bleed valve 49 is designed to be operated with the VBV door 50 in a fully closed or in a closed position as illustrated in FIG. 5 and in first and second or partial and full open positions as illustrated in FIGS. 6 and 7 respectively. The VBV door 50 may be rotated to any position between the fully closed position and the full open position as illustrated in FIGS. 6 and 7 respectively. Seals 242 on the aft lip 52 at the downstream aft end 54 of the door 50 are designed to engage and seal against the inner, middle, and outer bleed walls 70, 72, 74. Side door seals (not shown)

along side edges 86 of the VBV door 50 engage and seal against hub struts 132 in the hub frame 129. These seals minimize airflow losses and negative cycle impacts when the VBV door is in an open position.

Figure 8:
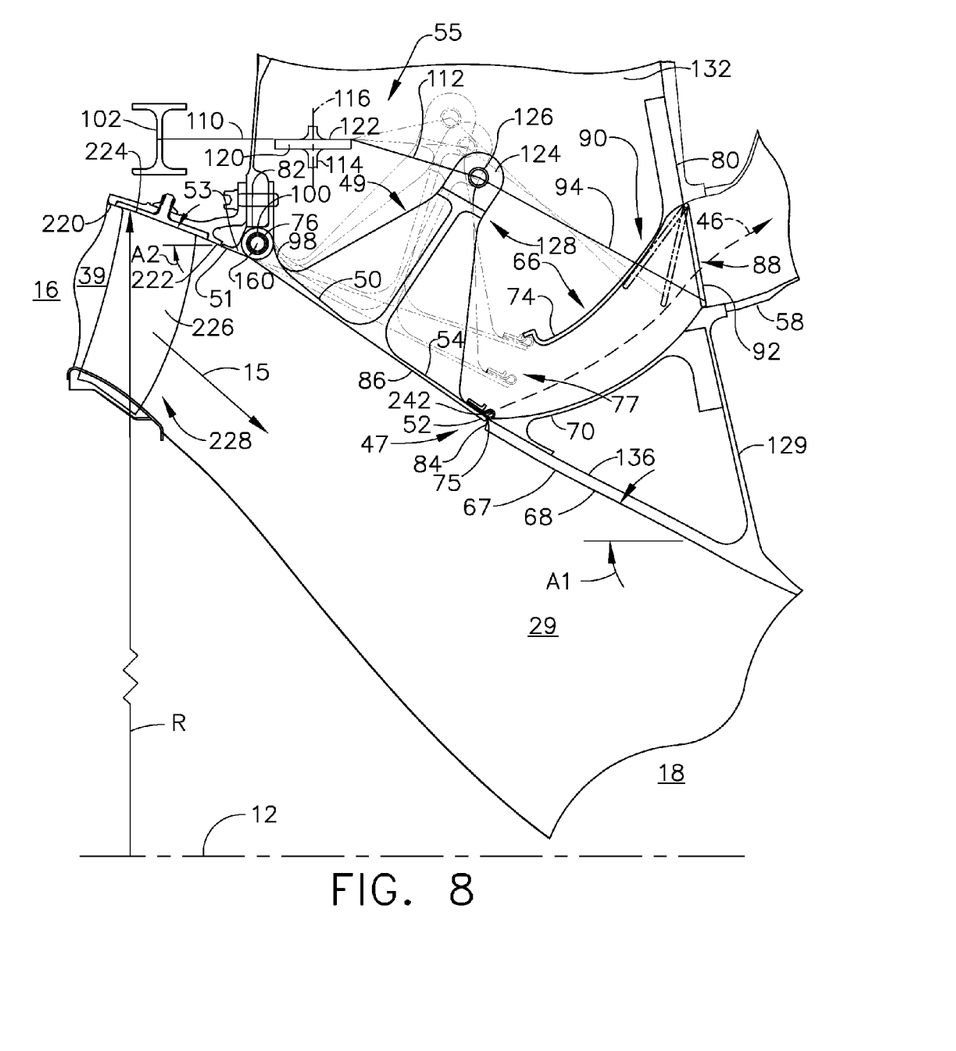
FIG. 8 is a sectional and diagrammatical view illustration of an alternative valve with a non-bifurcated bleed duct and variable airflow restrictor in a hub frame in the engine illustrated in FIG. 1.

Illustrated in FIG. 8 is an alternative variable bleed valve 49 with a non-bifurcated bleed duct 66 and a variable airflow restrictor 90 in the booster bleed flowpath 46. The bleed duct 66 is bounded by radially spaced apart and curved inner and outer bleed walls 70, 74 that are curved radially inwardly. The bleed duct 66 extends downstream or aft from a bleed duct inlet 77 to a bleed duct outlet 78. The variable airflow restrictor 90 is illustrated as a flapper valve 92 operably located at the duct outlet 78. The inwardly and outwardly opening flapper valve 92 is operably linked to the bellcrank 114 for actuation (opening and closing) by a valve link 94 between the flapper valve 92 and the radially outer end 128 of the VBV door 50. The variable airflow restrictor 90 and in particular the flapper valve 92 may be opened and closed in a controlled scheduled and proportional manner using appropriate linkage between the bellcrank and these restrictors.

Figure 9:
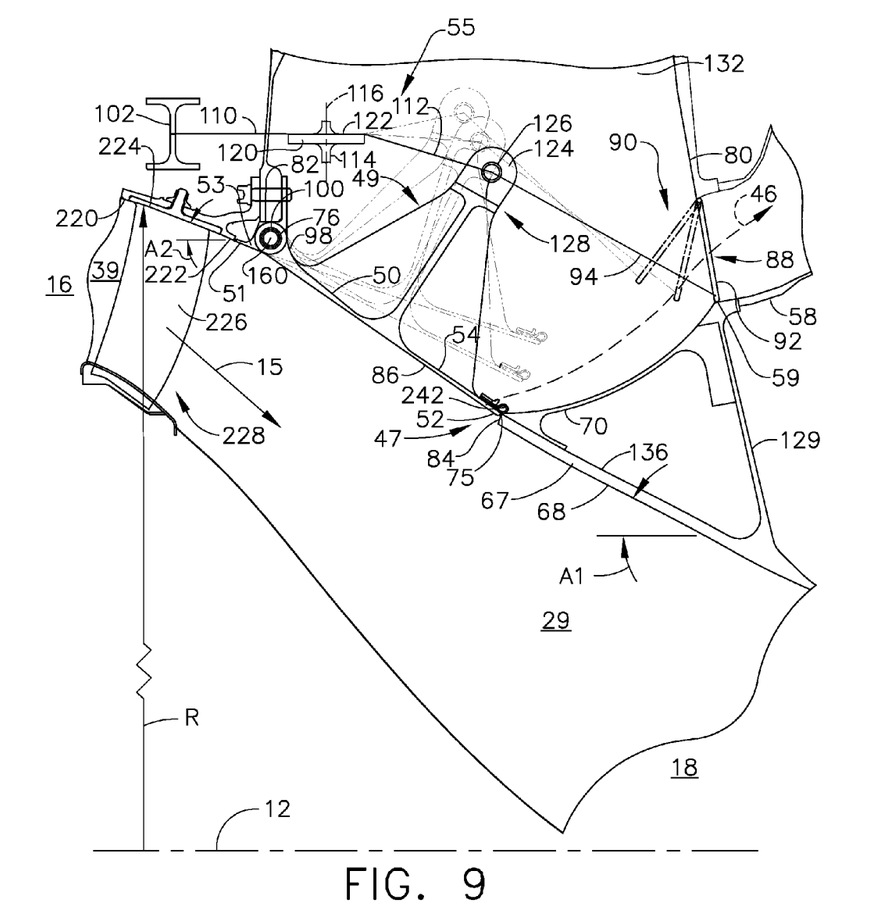
FIG. 9 is a sectional and diagrammatical view illustration of another alternative valve with a variable airflow restrictor and no bleed duct in the hub frame for use in the engine illustrated in FIG. 1.

Illustrated in FIG. 9 is another alternative variable bleed valve 49 with no bleed duct and a variable airflow restrictor 90 in the booster bleed flowpath 46. The booster bleed flowpath 46 extends downstream or aft from the VBV door 50 through the fan hub frame 129 where it is bounded radially inwardly by an inner bleed wall 70 that is curved radially inwardly. The variable airflow restrictor 90 is illustrated as a flapper valve 92 operably located at an exhaust duct inlet 59 to the bleed exhaust duct 58. The bleed exhaust duct 58 is illustrated herein as mounted on the fan hub frame 129. The inwardly and outwardly opening flapper valve 92 is operably linked to the bellcrank 114 for actuation (opening and closing) by a valve link 94 between the flapper valve 92 and the radially outer end 128 of the VBV door 50. The variable airflow restrictor 90 and in particular the flapper valve 92 may be opened and closed in a controlled scheduled and proportional manner using appropriate linkage between the bellcrank and these restrictors.

The present invention has been described in an illustrative manner. It is to be understood that the terminology which has been used is intended to be in the nature of words of description rather than of limitation. While there have been described herein, what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

What is claimed is:

1. A gas turbine engine variable bleed apparatus comprising:
   a variable bleed valve including a variable bleed valve door disposed in a bleed inlet in a transition duct;
   a forward lip and an aft lip located at respective upstream and downstream ends of the variable bleed valve door, wherein the variable bleed valve door is pivotable or rotatable about an axis at a forward end of the variable bleed valve door,
   wherein the variable bleed valve is operable to open and close a bleed slot open to a plurality of bleed duct passages forming a booster bleed flowpath located radially outward of the transition duct,
   wherein the bleed slot extends radially outwardly from an outer annular wall of the transition duct at the bleed inlet to the aft lip,
   wherein the aft lip forms a seal with the transition duct when the variable bleed valve is in a first closed position and wherein the aft lip forms a seal with each of the plurality of bleed duct passages when the variable bleed valve is in a first open position and when the variable bleed valve is in a second open position to modulate an amount of bleed air flowing through the plurality of bleed duct passages,
   wherein the booster bleed flowpath extends through a bifurcated bleed duct, the bifurcated bleed duct including an inner passage and an outer passage, an inner bleed wall and a middle bleed wall that are radially spaced apart to radially bound the inner passage, and wherein the middle bleed wall and an outer bleed wall are radially spaced apart and radially bound the outer passage;
   an airflow restrictor located in the booster bleed flowpath at an inner passage exit of the inner passage, wherein the airflow restrictor includes an outlet area of the inner passage at the inner passage exit larger than an inlet area of the inner passage,
   wherein the variable bleed valve door is operable to cooperate with and seal the aft lip at the aft end of the variable bleed valve door against the middle bleed wall to fully open the inner passage and wherein the variable bleed valve door is operable to cooperate with and seal the aft lip against the outer bleed wall to fully open the inner passage and the outer passage.

2. A gas turbine engine variable bleed apparatus comprising:
   a variable bleed valve including a variable bleed valve door disposed in a bleed inlet in a transition duct;
   a forward lip and an aft lip located at respective upstream and downstream ends of the variable bleed valve door, wherein the variable bleed valve door is pivotable or rotatable about an axis at a forward end of the variable bleed valve door,
   wherein the variable bleed valve is operable to open and close a bleed slot open to a plurality of bleed duct passages forming a booster bleed flowpath located radially outward of the transition duct,
   wherein the bleed slot extends radially outwardly from an outer annular wall of the transition duct at the bleed inlet to the aft lip,
   wherein the aft lip forms a seal with the transition duct when the variable bleed valve is in a first closed position and wherein the aft lip forms a seal with each of the plurality of bleed duct passages when the variable bleed valve is in a first open position and when the variable bleed valve is in a second open position to modulate an amount of bleed air flowing through the plurality of bleed duct passages, the transition duct having a transition duct conical angle with respect to an engine centerline, a booster outer shroud upstream and adjacent the transition duct,
   wherein the booster bleed flowpath extends through a bifurcated bleed duct, the bifurcated bleed duct including an inner passage and an outer passage, an inner bleed wall and a middle bleed wall that are radially spaced apart to radially bound the inner passage, and wherein the middle bleed wall and an outer bleed wall are radially spaced apart and radially bound the outer passage;
   an airflow restrictor located in the booster bleed flowpath at an inner passage exit of the inner passage, wherein the airflow restrictor includes an outlet area of the inner passage at the inner passage exit larger than an inlet area of the inner passage, wherein the variable bleed valve door is operable to cooperate with and seal the aft lip at the aft end of the variable bleed valve door against the middle bleed wall to fully open the inner passage and wherein the variable bleed valve door is operable to cooperate with and seal the aft lip against the outer bleed wall to fully open the inner passage and the outer passage.

* * * * *